United States Patent [19]

Ouchi et al.

[11] Patent Number: 5,261,075
[45] Date of Patent: Nov. 9, 1993

[54] OPTICAL RECORDING MEDIUM ACCESS SYSTEM

[75] Inventors: Kiyotaka Ouchi, Tokyo; Shunzo Takahashi; Masaaki Nishioka, both of Kanagawa, all of Japan

[73] Assignee: Kabushiki Kaisha CSK, Tokyo, Japan

[21] Appl. No.: 908,573

[22] Filed: Jul. 2, 1992

Related U.S. Application Data

[63] Continuation of Ser. No. 474.112, Apr. 11, 1990, filed as PCT/JP89/00830, Aug. 16, 1989, abandoned.

[30] Foreign Application Priority Data

Aug. 16, 1988 [JP] Japan ............................... 63-203644

[51] Int. Cl.$^5$ .............................................. G06F 13/00
[52] U.S. Cl. ................................ 395/425; 395/250; 364/DIG. 2; 364/939; 364/939.2; 364/939.3; 364/952.31; 364/952.4; 364/952.6; 364/955.3; 364/962.1; 364/964.2
[58] Field of Search ............... 395/275, 425, 325, 725, 395/250, DIG. 1, DIG. 2

[56] References Cited

U.S. PATENT DOCUMENTS

| | | | |
|---|---|---|---|
| 4,371,929 | 2/1983 | Brann et al. | 395/425 |
| 4,775,969 | 10/1988 | Osterlund | 369/53 |
| 4,947,367 | 8/1990 | Chang et al. | 395/500 |
| 4,975,829 | 12/1990 | Clarey et al. | 395/275 |
| 5,034,914 | 7/1991 | Osterland | 395/425 |
| 5,073,854 | 12/1991 | Martin et al. | 395/425 |

FOREIGN PATENT DOCUMENTS

| | | |
|---|---|---|
| 6156936 | 12/1981 | Japan. |
| 716664 | 10/1982 | Japan. |
| 8189750 | 11/1983 | Japan. |
| 63-2185 | 1/1988 | Japan. |
| 63-89922 | 4/1988 | Japan. |
| 3129586 | 6/1988 | Japan. |

Primary Examiner—Michael R. Fleming
Assistant Examiner—Ayaz R. Sheikh
Attorney, Agent, or Firm—Lackenbach, Siegel, Marzullo, Aronson & Greenspan

[57] ABSTRACT

A control board connected to a main body of a computer, which has access to an optical recording medium through an optical recording medium read/write device, and for controlling and enabling the optical recording medium read/write device to have access to the optical recording medium in the same manner as an existing magnetic disk device and the like have with respect to a magnetic medium. This control board is composed of a directory development processing station, various types of interface processing stations, a retrieval processing station, a data transfer/receiving processing station, a data input/output processing station and a directory update processing station. It is possible to have access as easily to the optical recording medium as to other existing media by using commands, I/O functions, and so on in the computer body. Furthermore, compared with access to the optical recording medium read/write device by only use of software installed in the computer body, the burden on the computer body is reduced in connection with memory size and processing time.

4 Claims, 5 Drawing Sheets

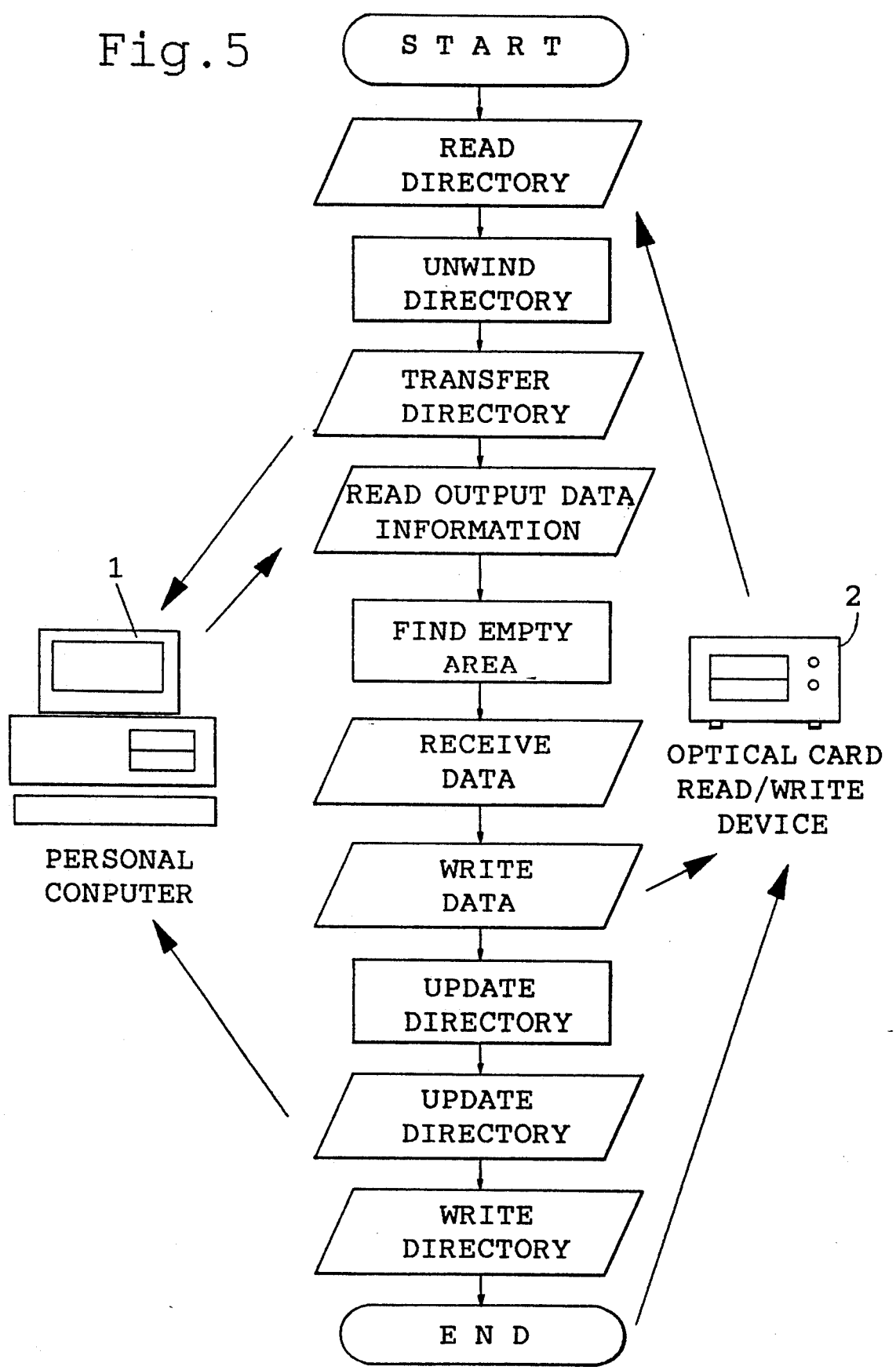

OPTICAL RECORDING MEDIUM ACCESS SYSTEM

This application is a continuation of application Ser. No. 07/474,112, filed Apr. 11, 1990 filed as PCT/JP89/00830, Aug. 16, 1989 now abandoned.

TECHNICAL FIELD

The present invention relates to a control board for access to an optical recording medium which can have access to a device for a special recording medium, that is, an optical recording medium, as easily as to a device for existing magnetic disks and the like.

BACKGROUND ART

In a conventional personal computer, data access is performed by use of a recording medium, such as a magnetic disk. In this case, the input/output of a magnetic disk device is controlled by an operating system (OS) built into the personal computer.

When the personal computer has access to a device for an optical recording medium, which is a special recording medium, exclusive software other than the above-mentioned OS is incorporated into the personal computer in order to control the input/output of the device for the optical recording medium.

In the case of access to the optical recording medium in the above-mentioned conventional system, the following problems arise:

(1) Since the software for access to the optical recording medium is very large, if the software is incorporated into the personal computer, the burden on the memory size, processing time, etc. of the personal computer becomes heavy;

(2) Conventional recording media are erasable, while most optical recording media are not erasable. Therefore, it is impossible for the personal computer to treat the optical media in the same manner as the conventional media;

(3) In order to have access to the optical recording medium, the personal computer is required to use special I/O functions or commands;

(4) Every time access is requested from the personal computer, access to the optical recording medium is performed. Therefore, loss of time is caused;

(5) Since the optical recording medium is special, it is required to consider how to cope with errors in the medium; and (6) It is required to build a file system which makes the best use of the characteristics of the optical recording medium.

DISCLOSURE OF INVENTION

In order to solve the above problems, there is provided a control board for access to an optical recording medium, which is connected to a main body of a personal computer which has access to the optical recording medium through an optical recording medium read/write device, and for enabling access to the optical recording medium in the same state as an existing magnetic disk device and the like by use of the optical recording medium read/write device. Furthermore, the control board is composed of a directory unwinding processing station, various types of interface processing stations, a retrieval processing station, a data transfer/receiving processing station, a data input/output processing station and a directory update processing station.

Such composition enables access to the optical recording medium in the same manner as other existing media, by utilizing commands, I/O functions and so on in the computer body.

In addition, compared with access to the optical recording medium read/write device with only software installed in the computer body, it is possible to reduce the burden on the computer body in memory size and processing time.

In a preferred embodiment, a control board of the invention can be installed in a slot of the computer body.

BRIEF DESCRIPTION OF THE DRAWINGS

FIG. 5 is a flow chart showing a process of writing data from the personal computer to the optical card read/write device.

BEST MODE FOR CARRYING OUT THE INVENTION

Figure 1:
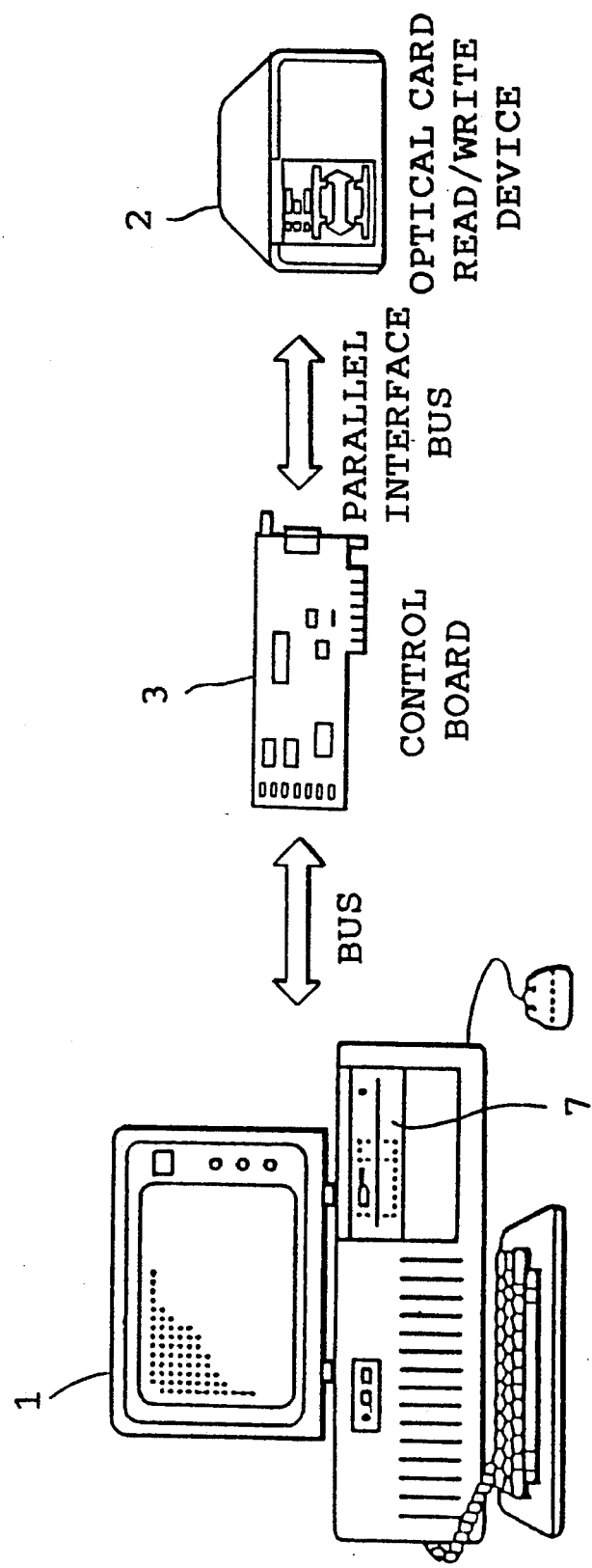
FIG. 1 is an outer view showing an arrangement of hardware in an optical recording medium access method, using a control board for access to an optical recording medium according to the invention.

Referring now to the drawings, an embodiment of this invention will be described in detail.

Figure 2:
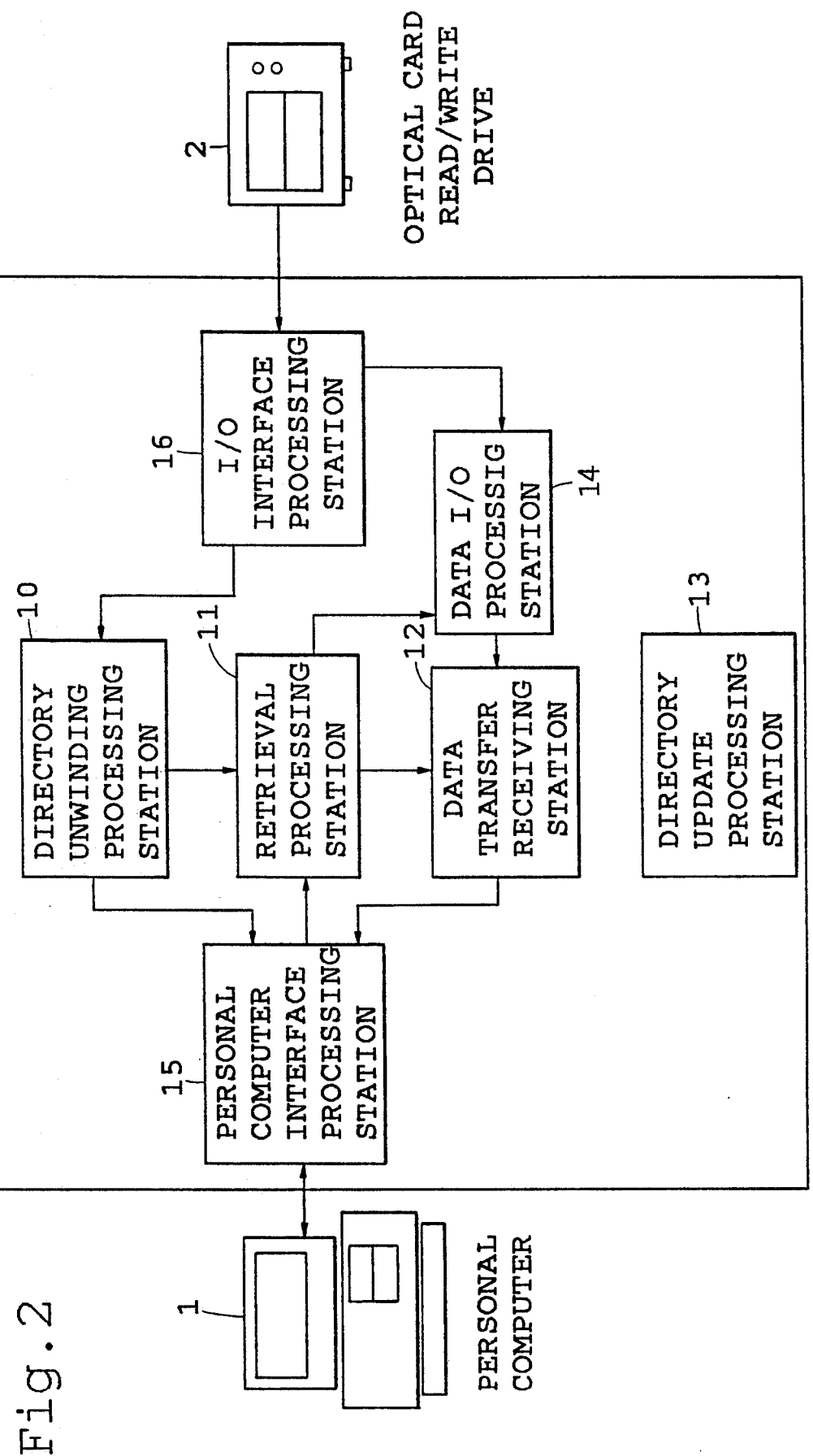
FIGS. 2 and 4 are block diagrams of a composition of the control board.
Figure 3:
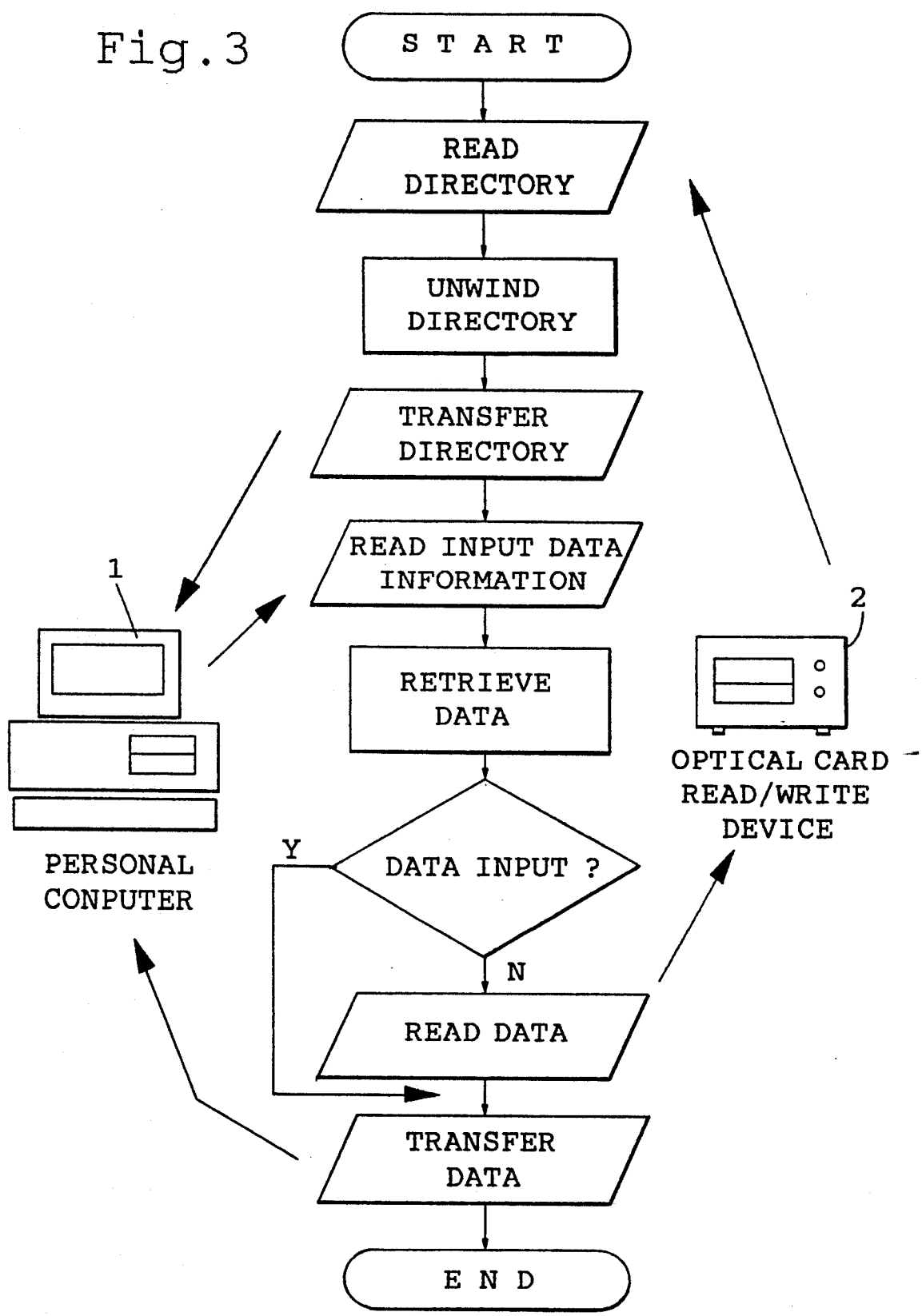
FIG. 3 is a flow chart showing a process of reading data from an optical card read/write device to a personal computer.

FIGS. 1 to 3 explain access to an optical recording medium by means of a control board for access to the optical recording medium according to an embodiment of this invention. In this embodiment, an optical card is used as the optical recording medium.

As shown in FIG. 1, a system according to the embodiment is constituted by a personal computer 1, an optical card read/write device 2 and a control board 3. The personal computer 1 is provided with a floppy disk device 7 which reads and writes data and programs as an auxiliary storage device therein.

The optical card read/write device 2 reads and writes data to/from an optical card with an optical head using laser beams. The optical card is a card-type storage medium, composed of a storage layer which can store digital values on a visiting-card-sized substrate by laser beams.

The control board 3 controls the access of the personal computer 1 to the optical card read/write device 2 and is installed in a slot of the personal computer 1.

As shown in FIG. 1, the personal computer 1 and the control board 3 are connected with each other through a bus and the control board 3 and the optical card read/write device 2 are connected with each other through a parallel interface bus.

FIG. 2 shows the composition of the control board 3. The control board 3 is composed of a directory development station 10, a retrieval processing station 11, a data transfer/receiving station 12, a directory update processing station 13, a data I/O processing station 14, a personal computer interface processing station 15 and an I/O interface processing station 16.

The directory development processing station 10 reads the directory of the optical card, converts the directory into a format according to an OS of the personal computer 1, and develops the directory on a storage section, such as RAM, of the control board 3.

The retrieval processing station 11 receives the data relative to the reading data and checks if the received data exists on the storage section of the control board 3, or receives the data relative to the writing data and finds an empty area on the storage section of the control board 3 for the received data.

The data transfer/receiving processing station 12 transfers data on the storage section of the control board 3 to the personal computer 1, and receives data from the personal computer 1 and stores the received data on the storage section of the control board 3.

The directory update processing station 13 adds a new directory entry, writes the added directory entry on the optical card, and then transfers the updated directory to the personal computer 1.

The data I/O processing station 14, the personal computer interface processing station 15, and the I/O interface processing station 16, control the transfer/receiving of data and commands between the personal computer 1 and the optical card read/write device 2.

Next, referring to the flow charts shown in FIGS. 2 and 3, the process of reading data from the optical card read/write device 2 to the personal computer 1 will be explained.

First, the directory development processing station 10 in the control board 3 reads a directory of the optical card through the I/O interface processing station 16, converts the read data into a format according to an OS of the personal computer 1, develops the converted data on the storage section of the control board 3 and transfers the data to the personal computer 1.

Secondly, the retrieval processing station 11 receives information relative to the received data from the personal computer 1 and checks if the data exists on the storage section of the control board 3. If it does, the data is transferred to the personal computer 1 by the data transfer/receiving station 12. If it does not, the data is read from the optical card through the data I/O processing station 14. Then, the data transfer/receiving station 12 stores the data in the storage section of the control board 3 and the data is transferred to the personal computer so that it is not required to have access to the same data from the optical card later. The arrows shown in FIG. 2 indicate the flows of commands and data.

Figure 4:
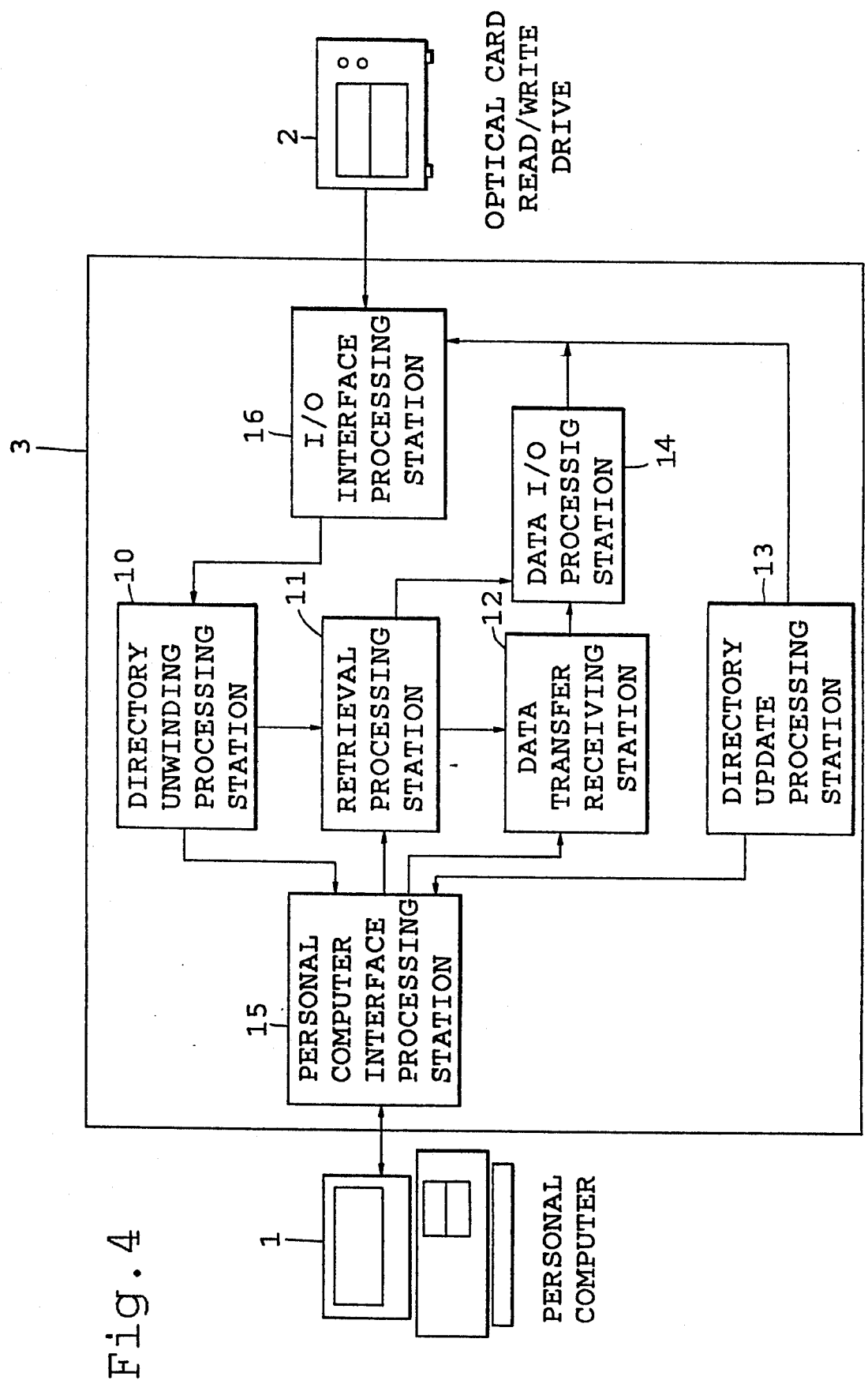

Referring to FIGS. 4 and 5, the process of writing data from the personal computer 1 to the optical card read/write device 2 will be explained.

As is the same with the reading process, first, a directory is developed by the directory development processing station 10. After that, the retrieval processing station 11 receives information relative to writing data and finds an empty area for writing the writing data on the storage section of the control board 3. The writing data from the personal computer 1 is stored in the empty area by the data transfer/receiving station 12.

The stored data is written on the optical card through the data I/O processing station 14. Lastly, the directory is updated by the directory update processing station 13. In other words, a new directory entry is added, the added entry is written on the optical card, and the updated directory is transferred to the personal computer 1.

In the above description, the processing of the directory development processing station 10 is always executed first. However, this may be done only when the power of the system is turned on or when the optical card is exchanged for another. Once the directory is developed and transferred to the personal computer 1, the retrieval processing may be executed first without the development process after that.

In the embodiment described above, access to an optical card as an optical recording medium is explained. The control board of this invention may be applied to access an optical disk and the like.

What is claimed is:

1. A control board connectable in use to a computer having a storage center and an optical recording medium of an optical card for accessing said optical recording medium similarly to accessing a magnetic disk comprising:

a directory developing station to read a directory of the optical recording medium and to convert it into a format according to an operating system of the computer and develop a converted directory on a storage station;

a retrieval processing station coupled to the directory developing station for receiving inputs therefrom and to the computer to receive as an input, in a reading mode, information concerning reading data from the computer and determine whether corresponding data exists already in the storage station, and to receive, in a writing mode, information from the directory developing station and to find an empty area on the storage station for the writing data;

a data transfer/receiving processing station coupled to the retrieval processing station and to the computer to transfer the reading data, when it already exists in the storage station, to the computer and to read the reading data from the optical recording medium, when it does not exist in the storage station, and send it to the computer after storing the reading data in the storage station in the empty area in the storage station found by the retrieval processing station;

a data I/O processing station and a computer interface processing station coupled in use to the computer, the directory developing station, the retrieval processing station and the data transfer/receiving station, an I/O interface processing station coupled in use to a read-write device, the data I/O processing station and the directory developing processing station for controlling transfer/receipt of data and command between the computer and the read/write device; and a directory update processing station coupled to the I/O interface processing station and to the computer interface processing station to develop new directory entries so that updating of the directory is written on the optical recording medium and the updated directory is transferred to the computer.

2. A control board according in claim 1, in which said control board is portable, and computer is a personal computer and has a slot in which said control is housable.

3. In combination a control board, a computer having a storage center and an optical recording medium of an optical read/write device for accessing said optical card similarly to accessing a magnetic disk, said control board comprising:

a directory developing station to read a directory of the optical recording medium and to convert it into a format according to an operating system of the computer and develop a converted directory on a storage station:

a retrieval processing station coupled to the directory developing station for receiving inputs therefrom and to the computer to receive as an input, in a reading mode, information concerning reading data from the computer and determine whether corresponding data exists already in the storage station, and to receive, in a writing mode, information from the directory developing station and to find an empty area on the storage station for the writing data;

a data transfer/receiving processing station coupled to the retrieval processing station and to the computer to transfer the reading data, when it already exists in the storage station, to the computer and to read the reading data from the optical recording medium, when it does not exist in the storage station, and sent it to the computer after storing the reading data in the storage station in the empty area in the storage station found by the retrieval processing station;

a data I/O processing station and a computer interface processing station coupled in use to the computer, the directory developing station the retrieval processing station and the data transfer/receiving station, an I/O interface processing station coupled in use to a read-write device, the data I/O processing station and the directory developing processing station for controlling transfer/receipt of data and command between the computer and the read/write device; and a directory update processing station coupled with the I/O interface processing station and to the computer interface processing station to develop new directory entries so that updating of the directory is written on the optical recording medium and the updated directory is transferred to the computer.

4. The combination according to claim 3, in which said control board is connectable and disconnectable, means for connecting the control board to the computer, and means for connecting the control board to the optical recording medium of the optical read/write device.

* * * * *